(12) United States Patent
Kim et al.

(10) Patent No.: US 9,112,367 B2
(45) Date of Patent: Aug. 18, 2015

(54) WIRELESS POWER TRANSMISSION SYSTEM, METHOD AND APPARATUS FOR TRACKING RESONANCE FREQUENCY IN WIRELESS POWER TRANSMISSION SYSTEM

(75) Inventors: Nam Yun Kim, Seoul (KR); Sang Wook Kwon, Seongnam-si (KR); Yun Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 13/561,292

(22) Filed: Jul. 30, 2012

(65) Prior Publication Data

US 2013/0026847 A1    Jan. 31, 2013

(30) Foreign Application Priority Data

Jul. 28, 2011 (KR) .................. 10-2011-0075020

(51) Int. Cl.
| | | |
|---|---|---|
| H02J 17/00 | (2006.01) | |
| G01R 23/15 | (2006.01) | |
| H03K 17/691 | (2006.01) | |
| H02J 5/00 | (2006.01) | |
| H02J 7/02 | (2006.01) | |
| H04B 5/00 | (2006.01) | |
| B60L 11/18 | (2006.01) | |

(52) U.S. Cl.
CPC .............. *H02J 5/005* (2013.01); *B60L 11/182* (2013.01); *B60L 11/1833* (2013.01); *H02J 7/025* (2013.01); *H04B 5/0037* (2013.01); *H04B 5/0081* (2013.01); *B60L 2210/10* (2013.01); *B60L 2210/30* (2013.01); *B60L 2210/40* (2013.01); *B60L 2250/16* (2013.01); *Y02T 10/7005* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01); *Y02T 90/16* (2013.01)

(58) Field of Classification Search
CPC ............ H02J 5/005; H02J 7/025; H02J 17/00
USPC .................................................. 307/104, 129
See application file for complete search history.

(56) References Cited

U.S. PATENT DOCUMENTS

| | | | |
|---|---|---|---|
| 7,825,543 B2 | 11/2010 | Karalis et al. | |
| 2009/0127937 A1* | 5/2009 | Widmer et al. | ............... 307/149 |
| 2010/0045114 A1 | 2/2010 | Sample et al. | |
| 2011/0081857 A1* | 4/2011 | Lee et al. | ..................... 455/41.1 |

FOREIGN PATENT DOCUMENTS

| | | |
|---|---|---|
| EP | 2 293 411 A2 | 3/2011 |
| JP | 2010-239769 A | 10/2010 |
| KR | 10-2010-0082030 A | 7/2010 |

* cited by examiner

*Primary Examiner* — Jared Fureman
*Assistant Examiner* — Rafael Pacheco
(74) *Attorney, Agent, or Firm* — NSIP Law

(57) ABSTRACT

A wireless power transmission system, a method and an apparatus for tracking a resonance frequency in the wireless power transmission system, are provided. A device of the wireless power transmission system includes a resonator configured to receive and output a power from another resonator of another device. The device further includes a power supply unit configured to provide, to a device load, the power output from the resonator. The device further includes a calibration load configured to receive the power output from the resonator in a calibration mode of the device to match resonance frequencies of the resonator and the other resonator. The device further includes a controller configured to selectively connect the resonator to the power supply unit or the calibration load, based on whether the device operates in the calibration mode.

20 Claims, 14 Drawing Sheets

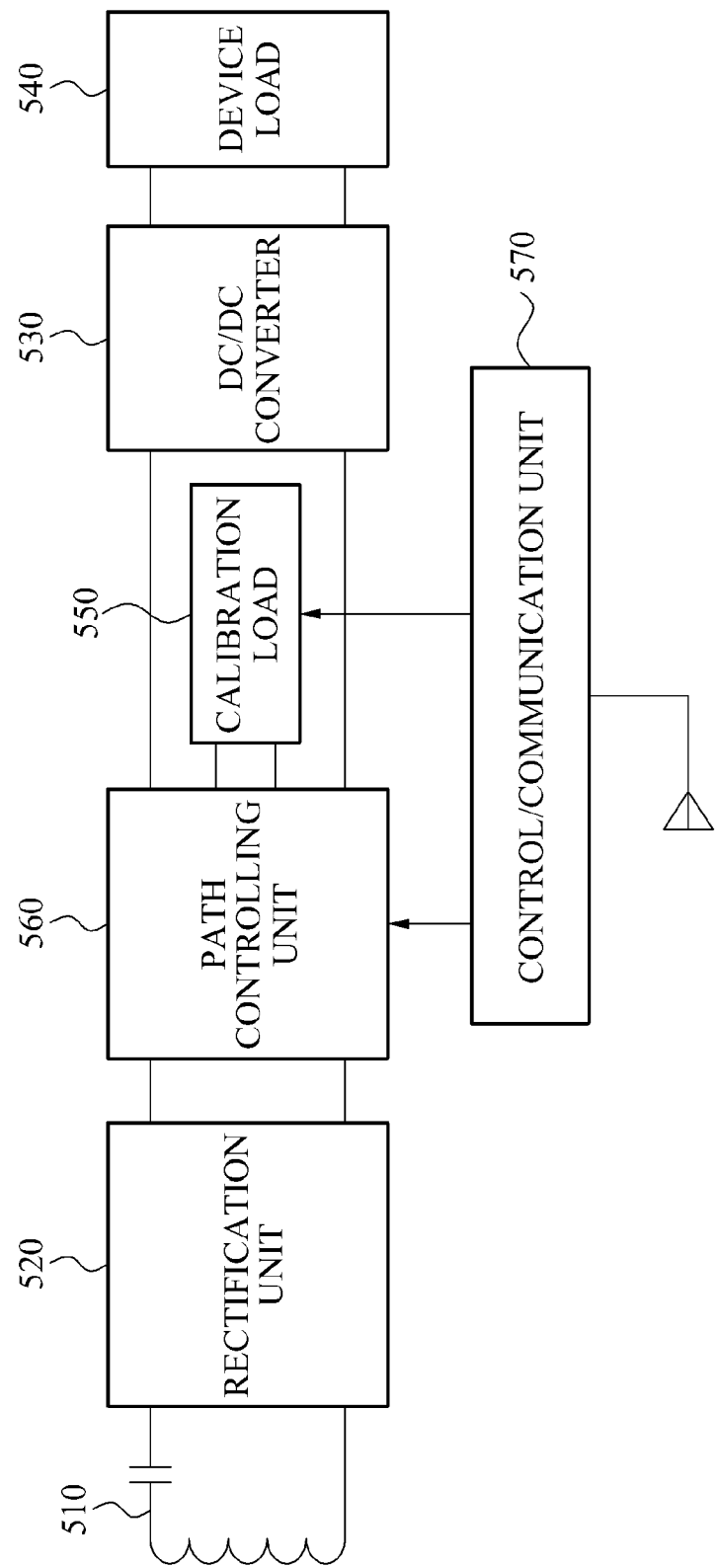

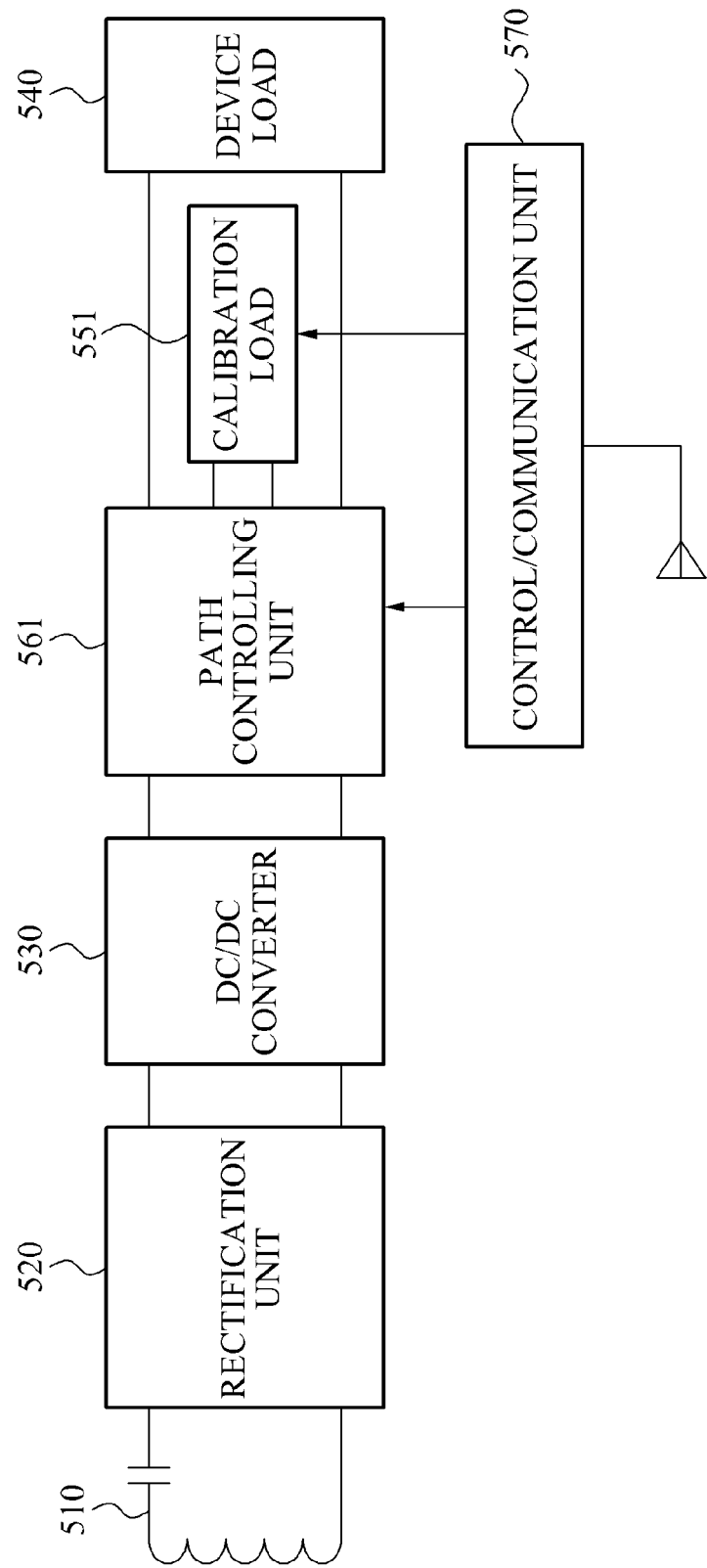

⟶ INPUT CURRENT
----▶ INDUCED CURRENT

WIRELESS POWER TRANSMISSION SYSTEM, METHOD AND APPARATUS FOR TRACKING RESONANCE FREQUENCY IN WIRELESS POWER TRANSMISSION SYSTEM

CROSS-REFERENCE TO RELATED APPLICATION(S)

This application claims the benefit under 35 U.S.C. §119(a) of Korean Patent Application No. 10-2011-0075020, filed on Jul. 28, 2011, in the Korean Intellectual Property Office, the entire disclosure of which is incorporated herein by reference for all purposes.

BACKGROUND

1. Field

The following description relates to a wireless power transmission system, a method and an apparatus for tracking a resonance frequency in the wireless power transmission system.

2. Description of Related Art

A wireless power refers to an energy that is transferred from a wireless power transmitter to a wireless power receiver using a magnetic coupling. A wireless power transmission system includes a source device that wirelessly transmits a power, and a target device that wirelessly receives the power. The source device may be referred to as a wireless power transmitter, and the target device may be referred to as a wireless power receiver.

The source device includes a source resonator, and the target device includes a target resonator. A magnetic coupling or a resonance coupling may be formed between the source resonator and the target resonator. The source device and the target device may perform communication to transmit and receive control information and state information.

According to characteristics of a wireless environment, a distance between the source device and the target device may be changed, or matching requirements of the source resonator and the target resonator may be changed. When the distance between the source device and the target device is changed, or the matching requirements of the source resonator and the target resonator are changed, a power transmission efficiency may be changed. Accordingly, there is a need for a method of maintaining the power transmission efficiency to be constant. In order to maintain the power transmission efficiency to be constant, a resonance frequency should be accurately tracked. As such, there is a need for a method of efficiently tracking the resonance frequency in a target device using a considerable amount of power.

SUMMARY

In one general aspect, there is provided a device of a wireless power transmission system, including a resonator configured to receive and output a power from another resonator of another device. The device further includes a power supply unit configured to provide, to a device load, the power output from the resonator. The device further includes a calibration load configured to receive the power output from the resonator in a calibration mode of the device to match resonance frequencies of the resonator and the other resonator. The device further includes a controller configured to selectively connect the resonator to the power supply unit or the calibration load, based on whether the device operates in the calibration mode.

The controller is further configured to select the calibration mode, or a charging mode of the device to provide, to the device load, the power output from the resonator, based on a request of the other device. The controller is further configured to generate a control signal based on the calibration mode or the charging mode. The controller is further configured to selectively connect the resonator to the power supply unit or the calibration load based on the control signal.

The controller is further configured to connect the resonator to the calibration load in the calibration mode. The controller is further configured to connect the resonator to the device load in the charging mode.

The controller is further configured to generate power efficiency information based on a voltage of and a current flowing through the calibration load in the calibration mode. The controller is further configured to transmit, to the other device, the power efficiency information.

An impedance of the calibration load equals an impedance of the device load. An amount of power consumed by the calibration load is less than an amount of power consumed by the device load.

An impedance of the calibration load includes a real number value and an imaginary number value.

An impedance of the calibration load changes based on a change in an impedance of the device load.

The power supply unit includes a rectification unit configured to rectify an alternating current (AC) voltage of the power output from the resonator to generate a direct current (DC) voltage. The power supply unit further includes a converter configured to adjust the DC voltage to be provided to the device load.

In another general aspect, there is provided a device of a wireless power transmission system, including a resonator configured to receive and output a power from another resonator of another device. The device further includes a rectification unit configured to rectify an alternating current (AC) voltage of the power output from the resonator to generate and output a direct current (DC) voltage. The device further includes a converter configured to adjust the DC voltage output from the rectification unit, and to provide, to a device load, an adjusted DC voltage. The device further includes a calibration load configured to receive the DC voltage output from the rectification unit in a calibration mode of the device to match resonance frequencies of the resonator and the other resonator. The device further includes a controller configured to selectively connect the rectification unit to the converter or the calibration load, based on whether the device operates in the calibration mode.

The controller is further configured to select the calibration mode, or a charging mode of the device to provide, to the device load, the adjusted DC voltage, based on a request of the other device. The controller is further configured to generate a control signal based on the calibration mode or the charging mode. The controller is further configured to selectively connect the rectification unit or the converter or the calibration load based on the control signal.

An impedance of the calibration load equals an impedance of the device load.

An impedance of the calibration load includes a real number value.

In still another general aspect, there is provided a method of tracking a resonance frequency in a wireless power transmission system, including transmitting, by a device, a first request to another device to enter a calibration mode to match resonance frequencies of the device and the other device. The method further includes receiving, from the other device, a first response to the first request that indicates that the other device operates in the calibration mode. The method further includes transmitting, to the other device, a calibration power. The method further includes detecting a reflected wave of the calibration power. The method further includes matching the resonance frequencies based on the reflected wave.

The method further includes transmitting, to the other device, a second request to switch from the calibration mode to a charging mode. The method further includes receiving, from the other device, a second response to the second request that indicates that the other device operates in the charging mode. The method further includes transmitting, to the other device, a charging power to be used to charge the other device, using the matched resonance frequency of the device.

In yet another general aspect, there is provided a method of tracking a resonance frequency in a wireless power transmission system, including transmitting, by a device, a first request to another device to enter a calibration mode to match resonance frequencies of the device and the other device. The method further includes receiving, from the other device, a first response to the first request that indicates that the other device operates in the calibration mode. The method further includes transmitting, to the other device, a calibration power. The method further includes receiving, from the other device, an amount of the calibration power received in the other device. The method further includes matching the resonance frequencies of the device and the other device based on the amount of the calibration power received in the other device.

The method further includes transmitting, to the other device, a second request to switch from the calibration mode to a charging mode. The method further includes receiving, from the other device, a second response to the second request that indicates that the other device operates in the charging mode. The method further includes transmitting, to the other device, a charging power to be used to charge the other device, using the matched resonance frequency of the device.

In still another general aspect, there is provided a method of tracking a resonance frequency in a wireless power transmission system, including receiving, by a device, a first request from another device to enter a calibration mode to match resonance frequencies of the other device and the device. The method further includes entering the calibration mode. The method further includes transmitting, to the other device, a first response to the first request that indicates that the device operates in the calibration mode. The method further includes receiving, from the other device, a calibration power. The resonance frequencies are matched based on a reflected wave of the calibration power.

The method further includes receiving, from the other device, a second request to switch from the calibration mode to a charging mode. The method further includes switching from the calibration mode to the charging mode. The method further includes transmitting, to the other device, a second response to the second request that indicates that the device operates in the charging mode. The method further includes receiving, from the other device, a charging power to be used to charge the device, using the matched resonance frequency of the device.

In yet another general aspect, there is provided a method of tracking a resonance frequency in a wireless power transmission system, including receiving, by a device, a first request from another device to enter a calibration mode to match resonance frequencies of the other device and the device. The method further includes entering the calibration mode. The method further includes transmitting, to the other device, a first response to the first request that indicates that the device operates in the calibration mode. The method further includes receiving, from the other device, a calibration power. The method further includes transmitting, to the other device, an amount of the calibration power received in the device. The resonance frequencies are matched based on the amount of the calibration power received in the device.

The method further includes receiving, from the other device, a second request to switch from the calibration mode to a charging mode. The method further includes switching from the calibration mode to the charging mode. The method further includes transmitting, to the other device, a second response to the second request that indicates that the device operates in the charging mode. The method further includes receiving, from the other device, a charging power to be used to charge the device, using the matched resonance frequency of the device.

Other features and aspects may be apparent from the following detailed description, the drawings, and the claims.

BRIEF DESCRIPTION OF THE DRAWINGS

FIGS. 5A and 5B are diagrams illustrating other examples of a target device.

Figure 1:
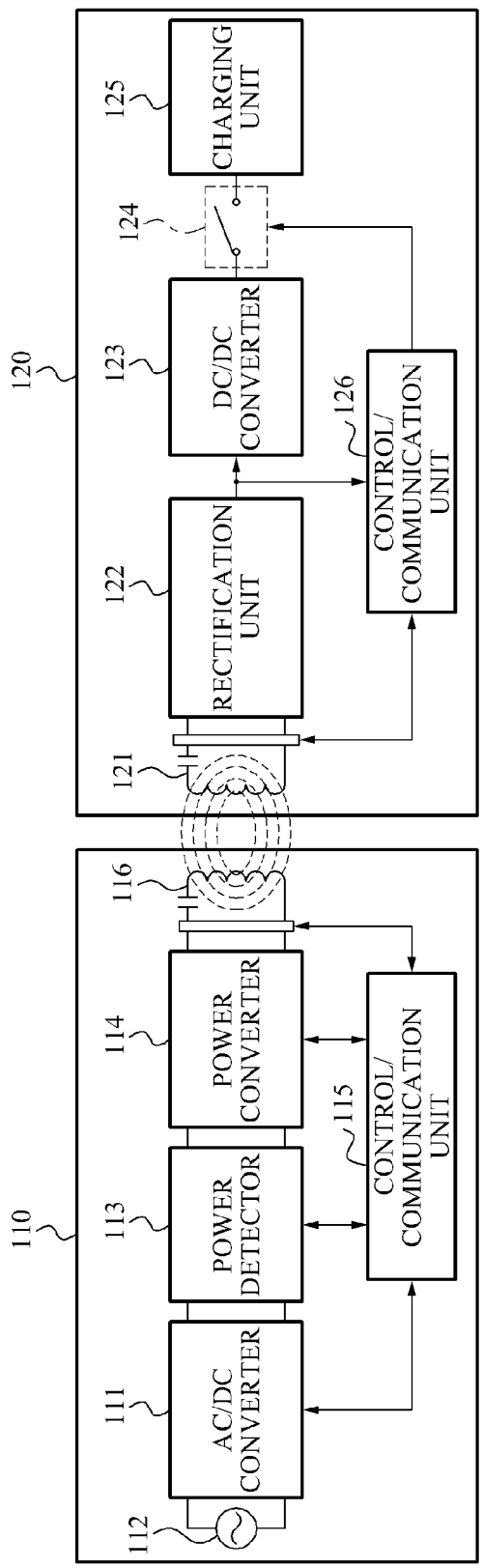
FIG. 1 is a diagram illustrating an example of a wireless power transmission and charging system.

Throughout the drawings and the detailed description, unless otherwise described, the same drawing reference numerals should be understood to refer to the same elements, features, and structures. The relative sizes and depictions of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a wireless power transmission and charging system. The wireless power transmission and charging system includes a source device 110 and a target device 120.

The source device 110 includes an alternating current-to-direct current (AC/DC) converter 111, a power supply 112, a power detector 113, a power converter 114, a control and communication (control/communication) unit 115, and a source resonator 116. The target device 120 includes a target resonator 121, a rectification unit 122, a DC-to-DC (DC/DC) converter 123, a switch unit 124, a charging unit 125, and a control/communication unit 126.

The AC/DC converter 111 rectifies an AC voltage in a band of tens of hertz (Hz) output from the power supply 112 to generate a DC voltage. The AC/DC converter 111 may output the DC voltage of a predetermined level, or may adjust an output level of the DC voltage based on a control of the control/communication unit 115.

The power detector 113 detects an output current and an output voltage of the AC/DC converter 111, and transfers, to the control/communication unit 115, information on the detected current and the detected voltage. Additionally, the power detector 113 may detect an input current and an input voltage of the power converter 114.

The power converter 114 converts the DC voltage to an AC voltage to generate a power, using a switching pulse signal in a band of a few megahertz (MHz) to tens of MHz. In other words, the power converter 114 may convert the DC voltage supplied to a power amplifier to an AC voltage, using a reference resonance frequency $F_{Ref}$, to generate a communication power to be used for communication, and/or a charging power to be used to charge, that may be used in one or more target devices. For example, the communication power may include a low power corresponding to 0.1 to 1 milliwatts (mW), and the charging power may include a high power corresponding to 1 mW to 200 Watts (W), which may be consumed by a device load of a target device. Hereinafter, the term "charging" may refer to supplying a power to an element or a unit that may use the power to charge a load. Also, the term "charging" may refer to supplying a power to an element or a unit that may consume the power. Also, the term "charging power" may refer to a power consumed for an operation of a target device, or a power necessary to charge a battery of the target device. In these examples, the unit or the element may include, for example, a battery, a display device, a sound output circuit, a main processor, and/or various types of sensors.

Hereinafter, the reference resonance frequency may refer to a resonance frequency used by the source device 110. Also, a tracking frequency may refer to a resonance frequency adjusted based on a predetermined scheme.

The control/communication unit 115 detects a reflected wave of the communication power and/or a reflected wave of the charging power, and detects mismatching between the target resonator 121 and the source resonator 116 based on the detected reflected wave. The control/communication unit 115 detects the mismatching by detecting an envelope of the reflected wave, and/or by detecting an amount of a power of the reflected wave. The control/communication unit 115 may calculate a voltage standing wave ratio (VSWR) based on a voltage level of the reflected wave, and a level of an output voltage of the source resonator 116 and/or the power converter 114. When the VSWR is less than a predetermined value, the control/communication unit 115 determines that the mismatching is detected. In this example, the control/communication unit 115 may calculate a power transmission efficiency of each of N predetermined tracking frequencies, determine a tracking frequency $F_{Best}$ having the best power transmission efficiency among the N predetermined tracking frequencies, and change the reference resonance frequency $F_{Ref}$ to the tracking frequency $F_{Best}$.

Also, the control/communication unit 115 controls a frequency of a switching pulse signal. That is, under the control of the control/communication unit 115, the frequency of the switching pulse signal is determined. By controlling the power converter 114, the control/communication unit 115 may generate a modulation signal to be transmitted to the target device 120. In other words, the control/communication unit 115 may transmit various messages to the target device 120 via in-band communication. Additionally, the control/communication unit 115 detects the reflected wave, and may demodulate a signal received from the target device 120 based on the envelope of the reflected wave.

The control/communication unit 115 may generate the modulation signal for in-band communication, using various schemes. For example, to generate the modulation signal, the control/communication unit 115 may turn on or off the switching pulse signal, or may perform delta-sigma modulation. Additionally, the control/communication unit 115 may generate a pulse-width modulation (PWM) signal with a predetermined envelope.

The control/communication unit 115 may perform out-band communication using a communication channel. The control/communication unit 115 may include a communication module, such as, for example, a ZigBee module, a Bluetooth module, and/or other types of modules. The control/communication unit 115 may transmit and receive data to and from the target device 120 via the out-band communication.

The source resonator 116 transfers an electromagnetic energy to the target resonator 121. For example, the source resonator 116 may transfer, to the target device 120, the communication power and/or the charging power using a magnetic coupling with the target resonator 121.

The target resonator 121 receives the electromagnetic energy from the source resonator 116. For example, the target resonator 121 may receive, from the source device 110, the communication power and/or the charging power using the magnetic coupling with the source resonator 116. Additionally, the target resonator 121 may receive various messages from the source device 110 via the in-band communication.

The rectification unit 122 rectifies an AC voltage to generate a DC voltage. That is, the rectification unit 122 rectifies the AC voltage received by the target resonator 121.

The DC/DC converter 123 adjusts a level of the DC voltage based on a capacity of the charging unit 125. For example, the DC/DC converter 123 may adjust the level of the DC voltage to be within a range of 3 volts (V) to 10 V.

The switch unit 124 is turned on or off under a control of the control/communication unit 126. When the switch unit 124 is turned off, the control/communication unit 115 of the source device 110 detects the reflected wave. In other words, when the switch unit 124 is turned off, the magnetic coupling between the source resonator 116 and the target resonator 121 is eliminated.

The charging unit 125 may include a battery. The charging unit 125 may charge the battery using the DC voltage output from the DC/DC converter 123.

The control/communication unit 126 may perform in-band communication to transmit and receive data using the resonance frequency. In this example, the control/communication unit 126 may detect a signal between the target resonator 121 and the rectification unit 122, or an output signal of the rectification unit 122, and may demodulate the detected signal. In other words, the control/communication unit 126 may demodulate a message received via the in-band communication.

Additionally, the control/communication unit 126 adjusts an impedance of the target resonator 121 to modulate a signal to be transmitted to the source device 110. For example, the control/communication unit 126 may turn on or off the switch unit 124 to modulate the signal to be transmitted to the source device 110. In another example, the control/communication unit 126 may increase the impedance of the target resonator 121 so that the control/communication unit 115 of the source device 110 detects the reflected wave. In this example, depending on whether the reflected wave is detected, the control/communication unit 115 of the source device 110 detects a binary number "0" or "1".

The control/communication unit 126 transmits, to the source device 110, a response message including a product type of the target device 120, manufacturer information of the target device 120, a product model name of the target device 120, a battery type of the target device 120, a charging scheme of the target device 120, an impedance value of a load of the target device 120, information about a characteristic of the target resonator 121 of the target device 120, information about a used frequency band of the target device 120, an amount of a power to be used for the target device 120, an intrinsic identifier of the target device 120, and/or product version information or standards information of the target device 120.

The control/communication unit 126 may also perform an out-band communication using a communication channel. The control/communication unit 126 may include a communication module, such as, for example, a ZigBee module, a Bluetooth module, and/or other types of modules. The control/communication unit 126 may transmit and receive data to and from the source device 110 via the out-band communication.

The control/communication unit 126 receives a wake-up request message from the source device 110, detects an amount of a power received by the target resonator 121, and transmit, to the source device 110, information about the amount of the power received by the target resonator 121. In this example, the information about the amount of the power received by the target resonator may include an input voltage value and an input current value of the rectification unit 122, an output voltage value and an output current value of the rectification unit 122, and/or an output voltage value and an output current value of the DC/DC converter 123.

The control/communication unit 115 of the source device 110 sets a resonance bandwidth of the source resonator 116. Based on the set resonance bandwidth, a Q-factor Qs of the source resonator 116 may be determined.

The control/communication unit 126 of the target device 120 sets a resonance bandwidth of the target resonator 116. Based on the set resonance bandwidth of the target resonator 116, a Q-factor of the target resonator 121 may be determined.

In this example, the resonance bandwidth of the source resonator 116 may be wider or narrower than the resonance bandwidth of the target resonator 121. Via a communication, the source device 110 and the target device 120 share information regarding the resonance bandwidths of the source resonator 116 and the target resonator 121. When the target device 120 requests a power greater than a reference value, the Q-factor Qs of the source resonator 116 may be set to a value greater than 100. When the target device 120 requests a power less than the reference value, the Q-factor Qs of the source resonator 116 may be set to a value less than 100.

In a resonance-based wireless power transmission, a resonance bandwidth may be an important factor. For example, Qt may indicate a Q-factor based on a change in a distance between the source resonator 116 and the target resonator 121, a change in a resonance impedance of the source resonator 116 and/or the target resonator 121, impedance mismatching between the source resonator 116 and the target resonator 121, a reflected signal in the source resonator 116 and/or the target resonator 121, and/or other types of factors. Qt may be in inverse proportion to a resonance bandwidth, as given in Equation 1.

$$\frac{\Delta f}{f_0} = \frac{1}{Qt} \qquad \text{[Equation 1]}$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between the source resonator 116 and the target resonator 121, $BW_S$ denotes a resonance bandwidth of the source resonator 116, and $BW_D$ denotes a resonance bandwidth of the target resonator 121.

In a resonance-based wireless power transmission, an efficiency U of the wireless power transmission may be given in Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad \text{[Equation 2]}$$

In Equation 2, K denotes a coupling coefficient regarding energy coupling between the source resonator 116 and the target resonator 121, $\Gamma_S$ denotes a reflection coefficient of the source resonator 116, $\Gamma_D$ denotes a reflection coefficient of the target resonator 121, $\omega_0$ denotes a resonance frequency, M denotes a mutual inductance between the source resonator 116 and the target resonator 121, $R_S$ denotes an impedance of the source resonator 116, $R_D$ denotes an impedance of the target resonator 121, $Q_S$ denotes a Q-factor of the source resonator 116, $Q_D$ denotes a Q-factor of the target resonator 121, and $Q_K$ denotes a Q-factor regarding energy coupling between the source resonator 116 and the target resonator 121. Referring to Equation 2, a Q-factor may be highly associated with the efficiency of the wireless power transmission.

Accordingly, the Q-factor may be set to a relatively great value in order to increase the efficiency of the wireless power transmission. In this example, when $Q_S$ and $Q_D$ are respectively set to a relatively great value, the efficiency of the wireless power transmission may be reduced based on a change in the coupling coefficient K regarding the energy coupling, a change in a distance between the source resonator 116 and the target resonator 121, a change in a resonance impedance of the source resonator 116 and/or the target resonator 121, impedance mismatching between the source resonator 116 and the target resonator 121, and/or other types of factors.

When each of the resonance bandwidths of the source resonator 116 and the target resonator 121 is set to be relatively narrow in order to increase the efficiency of the wireless power transmission, the impedance mismatching and/or other types of problems may occur due to insignificant external influences. In consideration of the impedance mismatching, Equation 1 may be expressed by Equation 3.

$$\frac{\Delta f}{f_0} = \frac{\sqrt{VSWR} - 1}{Q_t\sqrt{VSWR}} \qquad \text{[Equation 3]}$$

When the resonance bandwidths of the source resonator 116 and the target resonator 121, and/or a bandwidth of an impedance-matching frequency, remain unbalanced, the efficiency of the wireless power transmission may be reduced based on the change in the coupling coefficient K, the change in a distance between the source resonator 116 and the target resonator 121, the change in the resonance impedance, the impedance mismatching, and/or other types of factors. According to Equation 1 through Equation 3, when the resonance bandwidths of the source resonator 116 and the target resonator 121, and/or the bandwidth of the impedance-matching frequency, remain unbalanced, the Q-factor of the source resonator 116 and the Q-factor of the target resonator 121 may remain unbalanced as well.

Figure 2:
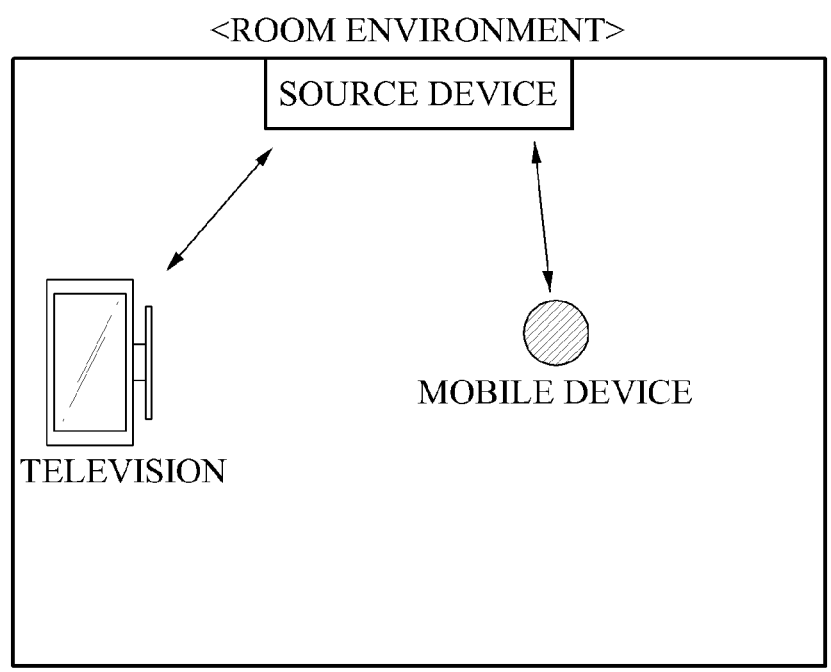
FIG. 2 is a diagram illustrating an example of applying a wireless power transmission and charging system.

FIG. 2 illustrates an example of applying a wireless power transmission and charging system. The wireless power transmission and charging system may be applied to an indoor environment, such as, for example, a room environment, and may include a source device and a target device. In the room environment, the target device may include a television or a mobile device. Also, in the room environment, the target device may include various other types of electronic devices.

Figure 3:
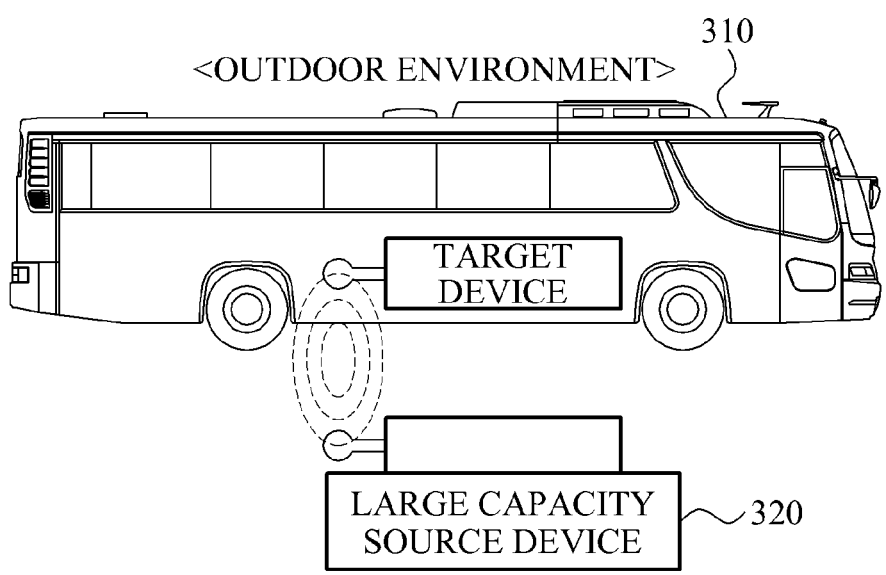
FIG. 3 is a diagram illustrating another example of applying a wireless power transmission and charging system.

FIG. 3 illustrates another example of applying a wireless power transmission and charging system. The wireless power transmission and charging system may be applied to an outdoor environment, and may include a source device and a target device. In the outdoor environment, the target device may be equipped in a vehicle 310. In this example, the target device equipped in the vehicle 310 may receive, from a large capacity source device 320, a power to be used to charge an automotive battery.

Figure 4:
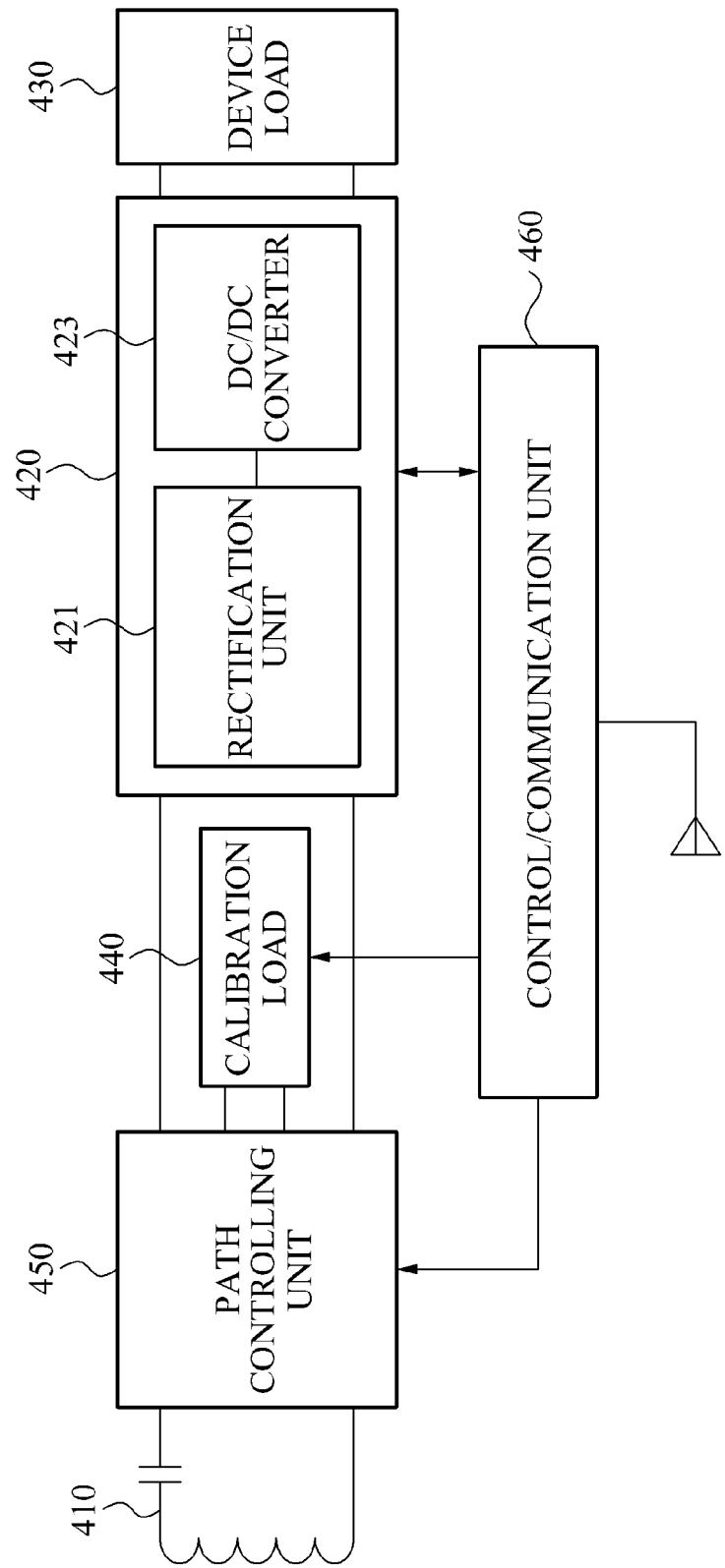
FIG. 4 is a diagram illustrating an example of a target device.

FIG. 4 illustrates an example of a target device 400. The target device 400 includes a target resonator 410, a power supply unit 420, a calibration load 440, a path controlling unit 450, and a control/communication unit 460. The target device 400 further includes a device load 430 including a unit consuming power. For example, the device load 430 may include a battery, a display device, a sound output circuit, a main processor, and/or various types of sensors.

The target resonator 410 forms a magnetic coupling with a source resonator of a source device. The power supply unit 420 provides, to the device load 430, a power received from the source device via the magnetic coupling. The power supply unit 420 includes a rectification unit 421 and a DC/DC converter 423. The rectification unit 421 rectifies an AC voltage (e.g., of the power) to generate a DC voltage. The DC/DC converter 423 adjusts a level of the generated DC voltage. That is, the DC/DC converter 423 changes the level of the DC voltage output from the rectification unit 421 to a level of a DC voltage to be used for the device load 430.

The calibration load 440 is used to match resonance frequencies of the source resonator and the target resonator 410. For example, an impedance of the calibration load 440 is determined based on an impedance of the device load 430. In this example, a value of the impedance of the calibration load 440 may equal a value of the impedance of the device load 430, and an amount of power consumed by the calibration load 440 may be less than an amount of power consumed by the device load 430. An output signal of the target resonator 410 corresponds to the AC voltage. Accordingly, the impedance of the calibration load 440 includes a real number value and an imaginary number value. That is, the impedance of the calibration load 440 includes a resistance element and a reactance element.

The impedance of the calibration load 440 may be variable depending on a change in the impedance of the device load 430. That is, the impedance of the calibration load 440 may be variable depending on a value of a resistance element or a value of a reactance element of the impedance of the device load 430.

The path controlling unit 450 connects the target resonator 410 to either the power supply unit 420 or the calibration load 440 based on a control signal output from the control/communication unit 460, to transfer the output signal of the target resonator 410 to either the power supply unit 420 or the calibration load 440. That is, when the target resonator 410 is connected to the power supply unit 420, the target resonator 410 is not connected to the calibration load 440. Conversely, when the target resonator 410 is connected to the calibration load 440, the target resonator 410 is not connected to the power supply unit 420.

The control/communication unit 460 selects a calibration mode to match the resonance frequencies of the source resonator and the target resonator 410, or a power charging mode to provide the power to the device load 440, based on, e.g., a request of the source device. The control/communication unit 460 generates the control signal depending on the selected mode, and outputs the control signal to the path controlling unit 450 to control the path controlling unit 450. That is, when the calibration mode is selected, the control/communication unit 460 generates and outputs the control signal so that the path controlling unit 450 connects the target resonator 410 to the calibration load 440. When the power charging mode is selected, the control/communication unit 460 generates and outputs the control signal so that the path controlling unit 450 connects the target resonator 410 to the power supply unit 420. Hereinafter, the path controlling unit 450 and the control/communication unit 460 may be referred to as a controller.

The control/communication unit 460 generates information about a power efficiency based on a voltage of and a current flowing through the calibration load 440 in the calibration mode. That is, the control/communication unit 460 detects the voltage of and the current flowing through the calibration load 440, and calculates an amount of power received in the calibration load 440 based on the detected voltage and the detected current. In this example, the information about the power efficiency corresponds to the amount of the power received in the calibration load 440. The control/communication unit 460 transmits the information about the power efficiency to the source device. The source device may calculate a power transmission efficiency based on the amount of the power received in the calibration load 440, and an amount of power transmitted from the source device to the target device 400.

FIGS. 5A and 5B illustrate other examples of a target device. When comparing the target device 400 of FIG. 4 and target devices 500 and 501 of FIGS. 5A and 5B, respectively, the calibration load 440, a calibration load 550, and a calibration load 551 are disposed in different locations. Additionally, the impedance of the calibration load 440 includes both the resistance element and the reactance element. However, each of an impedance of the calibration load 550 and an impedance of the calibration load 551 includes only a resistance element.

Referring to FIG. 5A, the target device 500 includes a target resonator 510, a rectification unit 520, a DC/DC converter 530, the calibration load 550, a path controlling unit 560, and a control/communication unit 570. The target device 500 further includes a device load 540. For example, the device load 540 may include a battery, a display device, a sound output circuit, a main processor, and/or various types of sensors.

The target resonator 510 forms a magnetic coupling with a source resonator of a source device to receive a power from the source device. The rectification unit 520 rectifies an AC voltage (e.g., of the power) output from the target resonator 510 to generate a DC voltage.

The DC/DC converter 530 adjusts a level of the generated DC voltage. That is, the DC/DC converter 530 changes the level of the DC voltage output from the rectification unit 520 to a level of a DC voltage to be used for the device load 540.

The calibration load 550 is used to match resonance frequencies of the source resonator and the target resonator 510. For example, an impedance of the calibration load 550 is determined based on an impedance of the device load 540. In this example, a value of the impedance of the calibration load 550 may equal a value of the impedance of the device load 540, and an amount of power consumed by the calibration load 550 may be less than an amount of power consumed by the device load 540. An output signal of the rectification unit 520 corresponds to the DC voltage. Accordingly, the impedance of the calibration load 550 includes a real number value. That is, the impedance of the calibration load 550 includes a resistance element.

The impedance of the calibration load 550 may be variable depending on a change in the impedance of the device load 540. That is, the impedance of the calibration load 550 may be variable depending on a value of a resistance element of the impedance of the device load 540.

The path controlling unit 560 connects the rectification unit 520 to either the DC/DC converter 530 or the calibration load 550 based on a control signal output from the control/communication unit 570, to transfer the DC voltage output from the rectification unit 520 to either the DC/DC converter 530 or the calibration load 550. The control/communication unit 570 selects a calibration mode to match the resonance frequencies of the source resonator and the target resonator 510, or a power charging mode to provide the power to the device load 540, based on, e.g., a request of the source device. The control/communication unit 570 generates the control signal depending on the selected mode, and outputs the control signal to the path controlling unit 560 to control the path controlling unit 560. That is, when the calibration mode is selected, the control/communication unit 570 generates and outputs the control signal so that the path controlling unit 560 connects the rectification unit 520 to the calibration load 550. When the power charging mode is selected, the control/communication unit 570 generates and outputs the control signal so that the path controlling unit 560 connects the rectification unit 520 to the DC/DC converter 530.

The control/communication unit 570 generates information about a power efficiency based on a voltage of and a current flowing through the calibration load 550 in the calibration mode. That is, the control/communication unit 570 detects the voltage of and the current flowing through the calibration load 550, and calculates an amount of power received in the calibration load 550 based on the detected voltage and the detected current. In this example, the information about the power efficiency corresponds to the amount of the power received in the calibration load 550. The control/communication unit 570 transmits the information about the power efficiency to the source device. The source device may calculate a power transmission efficiency based on the amount of the power received in the calibration load 550, and an amount of power transmitted from the source device to the target device 500.

Referring to FIG. 5B, the target device 501 includes the target resonator 510, the rectification unit 520, the DC/DC converter 530, the device load 540, and the control/communication unit 570 of FIG. 5A. The target device 501 further includes the calibration load 551 and a path controlling unit 561 that connects the DC/DC converter 530 to either the device load 540 or the calibration load 551 based on the control signal of the control/communication unit 570, to transfer the DC voltage output from the DC/DC converter 530 to either the device load 540 or the calibration load 551.

The control/communication unit 570 generates the control signal depending on the selected mode, and outputs the control signal to the path controlling unit 561 to control the path controlling unit 561. That is, when the calibration mode is selected, the control/communication unit 570 generates and outputs the control signal so that the path controlling unit 561 connects the DC/DC converter 530 to the calibration load 551. When the power charging mode is selected, the control/communication unit 570 generates and outputs the control signal so that the path controlling unit 561 connects the DC/DC converter 530 to the device load 540.

The control/communication unit 570 generates information about a power efficiency based on a voltage of and a current flowing through the calibration load 551 in the calibration mode. That is, the control/communication unit 570 detects the voltage of and the current flowing through the calibration load 551, and calculates an amount of power received in the calibration load 551 based on the detected voltage and the detected current. In this example, the information about the power efficiency corresponds to the amount of the power received in the calibration load 551. The control/communication unit 570 transmits the information about the power efficiency to the source device. The source device may calculate a power transmission efficiency based on the amount of the power received in the calibration load 551, and an amount of power transmitted from the source device to the target device 501.

Figure 6:
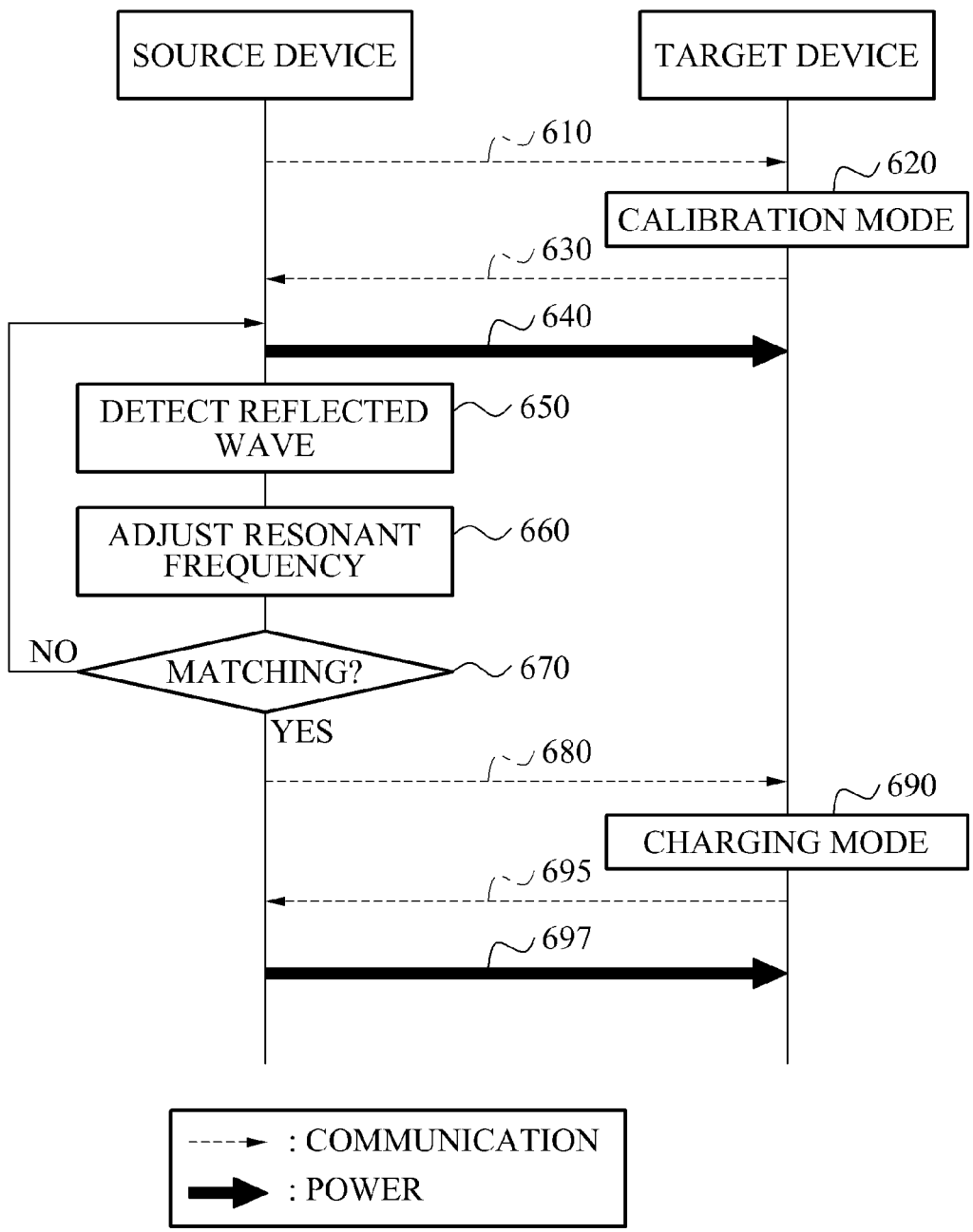
FIG. 6 is a swim lane flowchart illustrating an example of a method of tracking a resonance frequency in a wireless power transmission system.

FIG. 6 illustrates an example of a method of tracking a resonance frequency in a wireless power transmission system. In operation 610, a source device requests a target device to enter a calibration mode to match resonance frequencies of a source resonator and a target resonator.

In operation 620, the target device enters the calibration mode based on a control signal. That is, the target device generates the control signal to operate in the calibration mode, and to control a path controlling unit of the target device to connect a calibration power to be received from the source device to a calibration load of the target device.

In operation 630, the target device transits, to the source device, a response to the request that indicates that the target device has entered the calibration mode. In operation 640, the source device transmits, to the target device, the calibration power to match the resonance frequencies. For example, an amount of the calibration power may be equal to an amount of a communication power of the source device.

In operations 650 through 670, the source device matches the resonance frequencies based on a reflected wave of the calibration power. That is, in operation 650, the source device detects the reflected wave. In operation 660, the source device adjusts the resonance frequency of the source device based on the detected reflected wave. In operation 670, the source device determines whether the matching of the resonance frequencies is completed. For example, the matching may be completed when a VSWR of the detected reflected wave is greater than or equal to a predetermined value. The source device may continuously perform the operations 640 through 670 until the matching is completed.

When the matching of the resonance frequencies is completed, in operation 680, the source device requests the target device to switch from the calibration mode to a charging mode. In operation 690, the target device switches from the calibration mode to the charging mode in accordance with the request of the source device after the matching of the resonance frequencies is performed.

In operation 695, the target device reports, to the source device, that the switching from the calibration mode to the charging mode is completed. In operation 697, the source device transmits, to the target device, a charging power to be used to charge the target device, using the matched resonance frequency.

Figure 7:
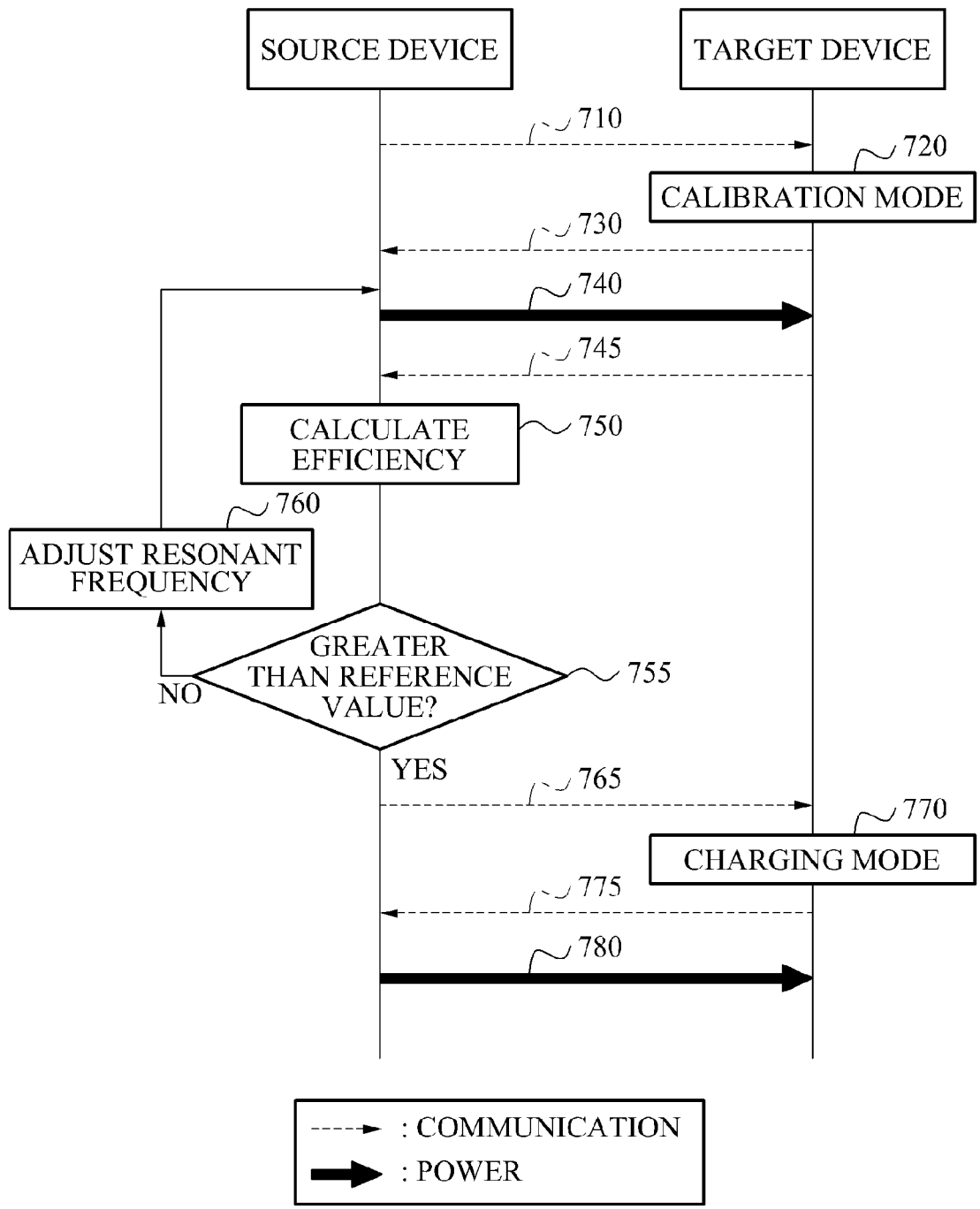
FIG. 7 is a swim lane flowchart illustrating another example of a method of tracking a resonance frequency in a wireless power transmission system.

FIG. 7 illustrates another example of a method of tracking a resonance frequency in a wireless power transmission system. In operation 710, a source device requests a target device to enter a calibration mode to match resonance frequencies of a source resonator and a target resonator.

In 720, the target device enters the calibration mode based on a control signal. That is, the target device generates the control signal to operate in the calibration mode, and to control a path controlling unit of the target device to connect a calibration power to be received from the source device to a calibration load of the target device.

In operation 730, the target device transmits, to the source device, a response to the request that indicates that the target device has entered the calibration mode. In operation 740, the source device transmits, to the target device, the calibration power to match the resonance frequencies. For example, an amount of the calibration power may be equal to an amount of a communication power of the source device.

In 745, the target device reports, to the source device, information about an amount of the calibration power received in the target device, namely, the calibration load. For example, the amount of the calibration power received in the calibration load may be calculated by multiplying a current flowing through the calibration load and a voltage of the calibration load.

In operations 750 through 760, the source device matches the resonance frequencies based on a power transmission efficiency of the calibration power. In operation 750, the source device calculates the power transmission efficiency. In this example, the power transmission efficiency is calculated based on a ratio of an amount of the calibration power transmitted from the source device and the amount of calibration power received in the calibration load. For example, the amount of the calibration power transmitted from the source device may be calculated by multiplying a current flowing through a power amplifier of the source device, and a voltage of the power amplifier.

In operation 755, the source device determines whether the power transmission efficiency is greater than a reference value. When the power transmission efficiency is less than or equal to the reference value, in operation 760, the source device adjusts the resonance frequency of the source device. When the power transmission efficiency is greater than the reference value, the source device determines that the matching of the resonance frequencies is completed. The source device and the target device may continuously perform the operations of 740 through 760, or the matching of the resonance frequencies based on the power transmission efficiency of the calibration power, until the matching is completed.

When the matching is completed, in operation 765, the source device requests the target device to switch from the calibration mode to a charging mode. In operation 770, the target device switches from the calibration mode to the charging mode in accordance with the request of the source device after the matching of the resonance frequencies is performed.

In operation 775, the target device reports, to the source device, that the switching from the calibration mode to the charging mode is completed. In operation 780, the source device transmits, to the target device, a charging power to be used to charge the target device, using the matched resonance frequency.

Hereinafter, a resonator referred to with reference to FIGS. 8 through 10, may include a source resonator and a target resonator.

Figure 8A:
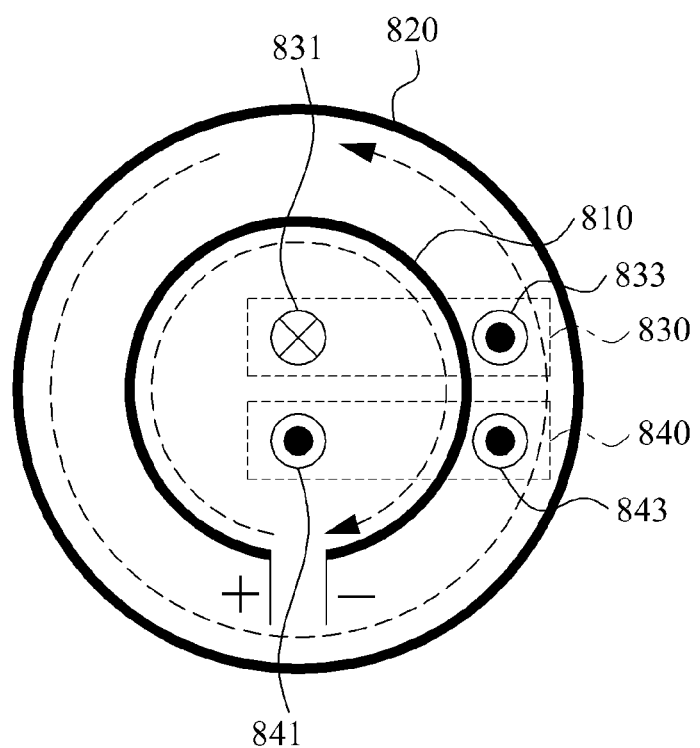
FIGS. 8A and 8B are diagrams illustrating examples of a distribution of a magnetic field in a resonator and a feeder.
Figure 8B:
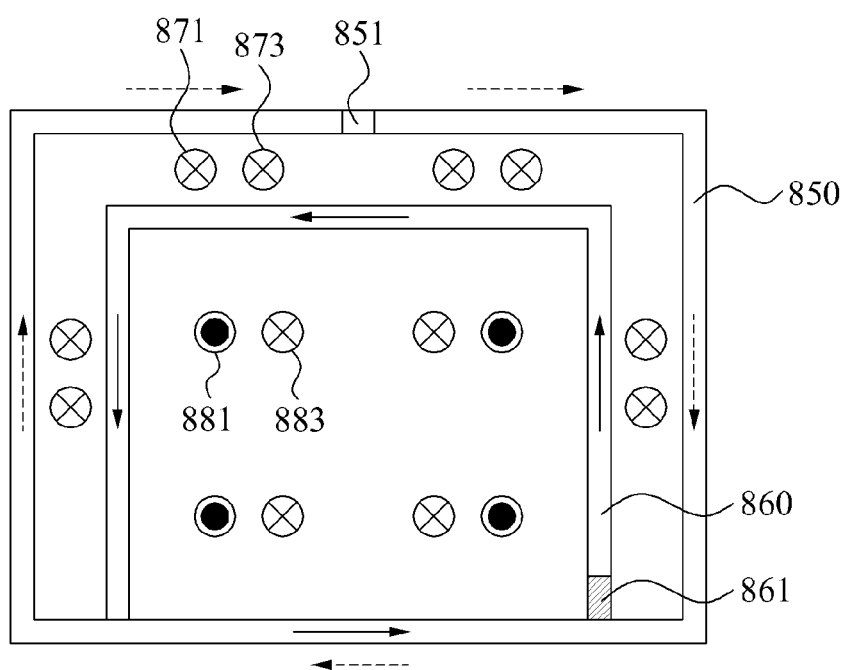

FIGS. 8A and 8B illustrate examples of a distribution of a magnetic field in a resonator and a feeder. In an example in which a source resonator receives power supply through a separate feeder, magnetic fields are generated in both the feeder and the source resonator.

Referring to FIG. 8A, when an input current flows through a feeder 810, a magnetic field 830 is generated. In this example, a direction 831 of the magnetic field 830 within the feeder 810 has a phase opposite to a phase of a direction 833 of the magnetic field 830 outside the feeder 810. The magnetic field 830 generates an induced current in a resonator 820. In this example, a direction of the induced current is opposite to a direction of the input current.

The induced current generates a magnetic field 840 in the resonator 820. A direction of the magnetic field 840 is identical in all positions of the resonator 820. That is, a direction 841 of the magnetic field 840 within the feeder 810 has the same phase as a direction 843 of the magnetic field 840 outside the feeder 810.

Consequently, when the magnetic field 830 generated by the feeder 810 and the magnetic field 840 generated by the resonator 820 are combined, a strength of a total magnetic field decreases within the feeder 810, but increases outside the feeder 810. Accordingly, when a power is supplied to the resonator 820 through the feeder 810, the strength of the total magnetic field decreases in a center of the resonator 820, but increases outside the resonator 820. When a magnetic field is randomly distributed in the resonator 820, it may be difficult to perform impedance matching since an input impedance may vary frequently. Additionally, when the strength of the total magnetic field is increased, an efficiency of wireless power transmission is increased. Conversely, when the strength of the total magnetic field is decreased, the efficiency of wireless power transmission is decreased. Accordingly, a power transmission efficiency is reduced on average.

Referring to FIG. 8B, a wireless power transmitter is shown, which includes a source resonator 850 and a feeder 860 that have a common ground. The resonator 850 includes a capacitor 851. The feeder 860 receives a radio frequency (RF) signal via a port 861.

For example, when the feeder 860 receives the RF signal, an input current is generated in the feeder 860. The input current flowing through the feeder 860 generates a magnetic field, which generates an induced current in the resonator 850. Additionally, the induced current generates another magnetic field. In this example, a direction of the input current flowing through the feeder 860 has a phase opposite to a phase of a direction of the induced current flowing through the resonator 850. Accordingly, in a region between the resonator 850 and the feeder 860, a direction 871 of the magnetic field generated by the input current has the same phase as a direction 873 of the magnetic field generated by the induced current, and thus, a strength of a total magnetic field increases. Conversely, within the feeder 860, a direction 881 of the magnetic field generated by the input current has a phase opposite to a phase of a direction 883 of the magnetic field generated by the induced current, and thus, the strength of the total magnetic field decreases. Therefore, the strength of the total magnetic field decreases in a center of the resonator 850, but increases outside the resonator 850.

The feeder 860 adjusts an internal area of the feeder 860 to determine an input impedance. In this example, the input impedance refers to an impedance viewed in a direction from the feeder 860 to the resonator 850. When the internal area of the feeder 860 is increased, the input impedance is increased. Conversely, when the internal area of the feeder 860 is decreases, the input impedance is decreased. Since the magnetic field is randomly distributed within the resonator 850 despite a reduction in the input impedance, a value of the input impedance varies depending on a location of a target device. Accordingly, a separate matching network may be required to match the input impedance to an output impedance of a power amplifier. For example, when the input impedance is increased, a separate matching network may be used to match the increased input impedance to a relatively-low output impedance of a power amplifier.

Figure 9A:
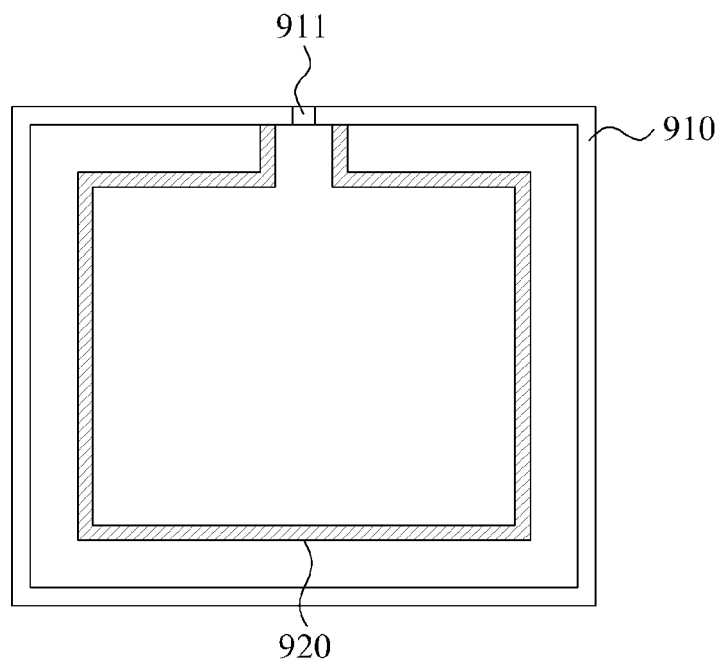
FIGS. 9A and 9B are diagrams illustrating examples of a resonator and a feeding unit.
Figure 9B:
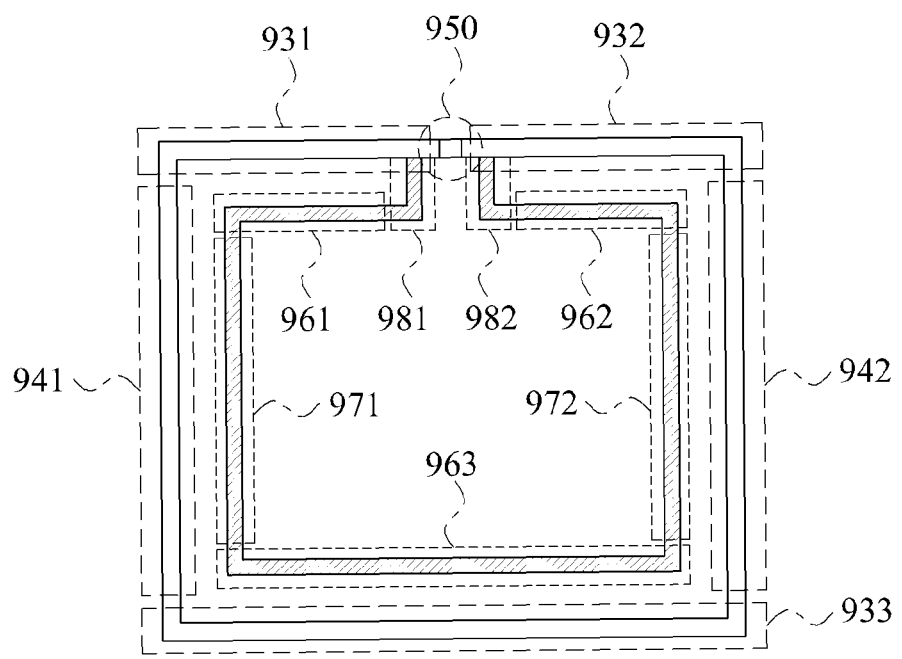

FIGS. 9A and 9B illustrate examples of a resonator and a feeding unit. Referring to FIG. 9A, a resonator 910 includes a capacitor 911. A feeding unit 920 is electrically connected to both ends of the capacitor 911.

FIG. 9B illustrates the structure of FIG. 9A in more detail. In this example, the resonator 910 includes a first transmission line, a first conductor 941, a second conductor 942, and at least one first capacitor 950.

The first capacitor 950 is inserted in series between a first signal conducting portion 931 and a second signal conducting portion 932 of the first transmission line, whereby an electric field is confined within the first capacitor 950. Generally, a transmission line may include at least one conductor in an upper portion of the transmission line, and may also include at least one conductor in a lower portion of the transmission line. A current may flow through the conductor disposed in the upper portion of the transmission line, and the conductor disposed in the lower portion of the transmission line may be electrically-grounded. Referring to FIG. 9B, a conductor disposed in an upper portion of the first transmission line is separated into and thereby referred to as the first signal conducting portion 931 and the second signal conducting portion 932. A conductor disposed in a lower portion of the first transmission line is referred to as a first ground conducting portion 933.

The resonator 910 has a two-dimensional (2D) structure. The first transmission line includes the first signal conducting portion 931 and the second signal conducting portion 932 in the upper portion of the first transmission line, and includes the first ground conducting portion 933 in the lower portion of the first transmission line. The first signal conducting portion 931 and the second signal conducting portion 932 is disposed to face the first ground conducting portion 933. A current flows through the first signal conducting portion 931 and the second signal conducting portion 932. The first ground conducting portion 933 is electrically-grounded.

Also, one end of the first signal conducting portion 931 is connected to the first conductor 941, and another end of the first signal conducting portion 931 is connected to the first capacitor 950. One end of the second signal conducting portion 932 is connected to the second conductor 942, and another end of the second signal conducting portion 932 is connected to the first capacitor 950. Accordingly, the first signal conducting portion 931, the second signal conducting portion 932, the first ground conducting portion 933, the first conductor 941, and the second conductor 942 are connected to each other, and the resonator 910 has an electrically closed-loop structure. The term "loop structure" may include a polygonal structure, for example, a circular structure, a rectangular structure, and/or other types of structures. "Having a loop structure" may indicate being electrically-closed.

The first capacitor 950 is inserted into an intermediate portion of the first transmission line. For example, the first capacitor 950 is inserted into a space between the first signal conducting portion 931 and the second signal conducting portion 932. The first capacitor 950 may have a shape of, for example, a lumped element, a distributed element, and/or other types of elements. In an example, a distributed capacitor having a shape of a distributed element, may include zigzagged conductor lines and a dielectric material having a relatively high permittivity between the zigzagged conductor lines.

When the first capacitor 950 is inserted into the first transmission line, the resonator 910 may have a property of a metamaterial. The metamaterial indicates a material having a predetermined electrical property that cannot be discovered in nature and thus, having an artificially-designed structure. An electromagnetic characteristic of all the materials existing in nature may include a unique magnetic permeability or a unique permittivity. Most materials have a positive magnetic permeability or a positive permittivity.

In the example of most materials, a right hand rule may be applied to an electric field, a magnetic field, and a Poynting vector, and thus, the corresponding materials may be referred to as right-handed materials (RHMs). However, the metamaterial has a magnetic permeability or a permittivity absent in nature and thus, may be classified into, for example, an epsilon negative (ENG) material, a mu negative (MNG) material, a double negative (DNG) material, a negative refractive index (NRI) material, a left-handed (LH) material, and/or other types of materials, based on a sign of the corresponding magnetic permeability or permittivity.

When a capacitance of the first capacitor 950 inserted as the lumped element is appropriately determined, the source resonator 910 may have the characteristic of the metamaterial. Since the source resonator 910 may have a negative magnetic permeability by appropriately adjusting the capacitance of the first capacitor 950, the source resonator 910 may also be referred to as an MNG resonator. Various criteria may be applied to determine the capacitance of the first capacitor 950. For example, the various criteria may include a criterion that enables the source resonator 910 to have the characteristic of the metamaterial, a criterion that enables the source resonator 910 to have a negative magnetic permeability in a target frequency, a criterion that enables the source resonator 910 to have a zeroth order resonance characteristic in the target frequency, and/or other types of criterion. Based on at least one criterion among the aforementioned criteria, the capacitance of the first capacitor 950 may be determined.

The source resonator 910, also referred to as the MNG resonator, may have a zeroth order resonance characteristic, or a resonance frequency when a propagation constant is "0". Since the source resonator 910 may have the zeroth order resonance characteristic, the resonance frequency may be independent with respect to a physical size of the source resonator 910. Accordingly, by appropriately designing the first capacitor 950, the resonance frequency of the source resonator 910 may be sufficiently changed. As such, the physical size of the source resonator 910 may not be changed.

In a near field, the electric field may be concentrated on the first capacitor 950 inserted into the first transmission line. Accordingly, due to the first capacitor 950, the magnetic field may become dominant in the near field. The source resonator 910 may have a relatively high Q-factor using the first capacitor 950 of the lumped element, and thus, it is possible to enhance an efficiency of power transmission. In this example, the Q-factor indicates a level of an ohmic loss or a ratio of a reactance with respect to a resistance in the wireless power transmission. It can be understood that the efficiency of the wireless power transmission may increase according to an increase in the Q-factor.

Although not illustrated, a magnetic core may be further provided to pass through the source resonator 910. The magnetic core may perform a function of increasing a power transmission distance.

Referring to FIG. 9B, the feeding unit 920 includes a second transmission line, a third conductor 971, a fourth conductor 972, a fifth conductor 981, and a sixth conductor 982. The second transmission line includes a third signal conducting portion 961 and a fourth signal conducting portion 962 in an upper portion of the second transmission line, and includes a second ground conducting portion 963 in a lower portion of the second transmission line. The third signal conducting portion 961 and the fourth signal conducting portion 962 are disposed to face the second ground conducting portion 963. A current flows through the third signal conducting portion 961 and the fourth signal conducting portion 962. The second ground conducting portion 963 is electrically-grounded.

Also, one end of the third signal conducting portion 961 is connected to the third conductor 971, and another end of the third signal conducting portion 961 is connected to the fifth conductor 981. One end of the fourth signal conducting portion 962 is connected to the fourth conductor 972, and another end of the fourth signal conducting portion 962 is connected to the sixth conductor 982. The fifth conductor 981 is connected to the first signal conducting portion 931, and the sixth conductor 982 is connected to the second signal conducting portion 932. The fifth conductor 981 and the sixth conductor 982 is connected in parallel to both ends of the first capacitor 950. In this example, each of the fifth conductor 981 and the sixth conductor 982 may be used as an input port to receive an input of an RF signal.

Accordingly, the third signal conducting portion 961, the fourth signal conducting portion 962, the second ground conducting portion 963, the third conductor 971, the fourth conductor 972, the fifth conductor 981, the sixth conductor 982, and the resonator 910 are connected to each other, and the resonator 910 and the feeding unit 920 have an electrically closed-loop structure. When the RF signal is input through the fifth conductor 981 or the sixth conductor 982, an input current flows through the feeding unit 920, and generates a magnetic field. The magnetic field generates an induced current in the resonator 910. A direction of the input current flowing through the feeding unit 920 is identical to a direction of the induced current flowing through the resonator 910. Accordingly, a strength of a total magnetic field increases in a center of the resonator 910, and decreases outside the resonator 910.

An input impedance is determined based on an area of a region between the resonator 910 and the feeding unit 920. Accordingly, a separate matching network may be unnecessary to match the input impedance to an output impedance of a power amplifier. When a matching network is used, the input impedance may be determined by adjusting a size of the feeding unit 920, and accordingly, a structure of the matching network may be simplified. The simplified structure of the matching network may reduce a matching loss of the matching network.

The second transmission line, the third conductor 971, the fourth conductor 972, the fifth conductor 981, and the sixth conductor 982 may have a structure identical to the structure of the resonator 910. That is, when the resonator 910 has a loop structure, the feeding unit 920 may also have a loop structure. Additionally, when the resonator 910 has a circular structure, the feeding unit 920 may also have a circular structure.

Figure 10A:
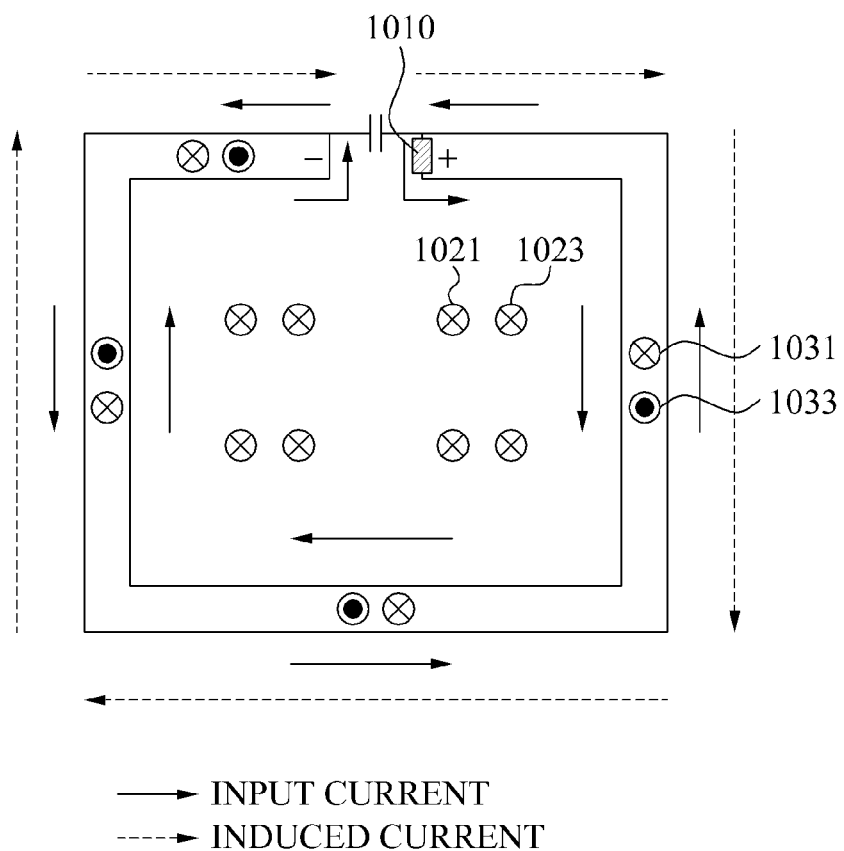
FIG. 10A is a diagram illustrating an example of a distribution of a magnetic field in a resonator based on feeding of a feeding unit.

FIG. 10A illustrates an example of a distribution of a magnetic field in a resonator based on feeding of a feeding unit. In a wireless power transmission, feeding may refer to supplying a power to a source resonator. The feeding may also refer to supplying an AC power to a rectification unit. The resonator 910 and the feeding unit 920 of FIG. 9A are more simply illustrated in FIG. 10A. FIG. 10A further illustrates a direction of an input current flowing through the feeding unit, and a direction of an induced current in the source resonator. FIG. 10A also illustrates a direction of a magnetic field generated by the input current, and a direction of a magnetic field generated by the induced current.

In more detail, a fifth conductor or a sixth conductor of the feeding unit may be used as an input port 1010. The input port 1010 receives an an RF signal. The RF signal may be output from a power amplifier. The power amplifier may increase and decrease an amplitude of the RF signal based on a demand of a target device. The RF signal is represented as the input current flowing through the feeding unit. The input current flowing through the feeding unit flows clockwise along a transmission line of the feeding unit. The fifth conductor or the sixth conductor of the feeding unit is electrically-connected to the resonator. For example, the fifth conductor is connected to a first signal conducting portion of the resonator. Accordingly, the input current flows through the resonator, as well as through the feeding unit. The input current flows counterclockwise in the resonator.

The input current flowing through the resonator generates a magnetic field, and the magnetic field generates the induced current in the resonator. The induced current flows clockwise in the resonator. In this example, the induced current transfers energy to a capacitor of the resonator. Also, the induced current generates another magnetic field. In FIG. 10A, the input current flowing through the feeding unit and the resonator is indicated using a solid line, and the induced current flowing through the resonator is indicated using a dotted line.

A direction of a magnetic field generated by a current may be determined based on the right hand rule. Within the feeding unit, a direction 1021 of the magnetic field generated by the input current flowing through the feeding unit, is identical to a direction 1023 of the magnetic field generated by the induced current flowing through the resonator. Accordingly, a strength of a total magnetic field increases within the feeding unit.

In contrast, in a region between the feeding unit and the resonator, a direction 1033 of the magnetic field generated by the input current flowing through the feeding unit, has a phase opposite to a phase of a direction 1031 of the magnetic field generated by the induced current flowing through the resonator. Accordingly, the strength of the total magnetic field decreases in the region between the feeding unit and the resonator.

Generally, in a resonator having a loop structure, a strength of a magnetic field decreases in a center of the resonator, and increases outside the resonator. However, referring to FIG. 10A, the feeding unit is electrically-connected to both ends of the capacitor of the resonator, and accordingly, the direction of the induced current of the resonator is identical to the direction of the input current of the feeding unit. Since the direction of the induced current of the resonator is identical to the direction of the input current of the feeding unit, the strength of the total magnetic field increases within the feeding unit, and decreases outside the feeding unit. Consequently, due to the feeding unit, the strength of the total magnetic field increases in the center of the resonator having the loop structure, and decreases outside the resonator. Accordingly, the strength of the total magnetic field is constant within the entire resonator. Since a power transmission efficiency of transferring a power from a source resonator to a target resonator is proportional to a strength of a magnetic field generated in the source resonator, when the strength of the total magnetic field increases in a center of the source resonator, the power transmission efficiency also increases.

Figure 10B:
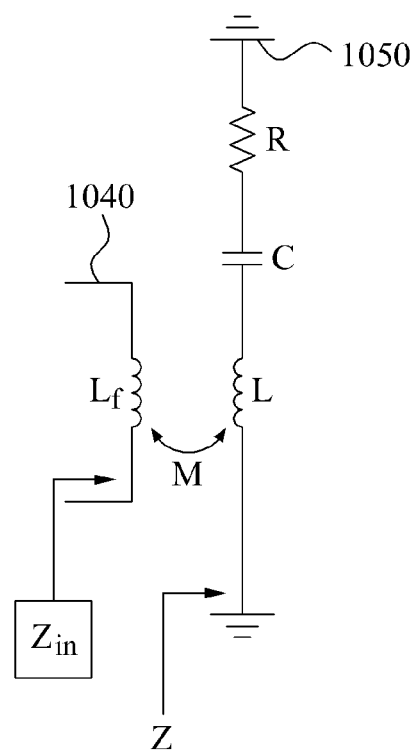
FIG. 10B is a diagram illustrating examples of equivalent circuits of a feeding unit and a resonator.

FIG. 10B illustrates examples of equivalent circuits of a resonator 1050 and a feeding unit 1040. An input impedance $Z_{in}$ viewed in a direction from the feeding unit 1040 to the resonator 1050 may be given by Equation 4.

$$Z_{in} = \frac{(\omega M)^2}{Z}$$ [Equation 4]

In Equation 4, M denotes a mutual inductance between the feeding unit 1040 and the resonator 1050, ω denotes a resonance frequency between the feeding unit 1040 and the resonator 1050, and Z denotes an impedance viewed in a direction from the resonator 1050 to a target device. The input impedance $Z_{in}$ may be proportional to the mutual inductance M. Accordingly, the input impedance $Z_{in}$ may be controlled by adjusting the mutual inductance M. The mutual inductance M may be adjusted based on an area of a region between the feeding unit 1040 and the resonator 1050. The area of the region between the feeding unit 1040 and the resonator 1050 may be adjusted based on a size of the feeding unit 1040. Since the input impedance $Z_{in}$ may be determined based on the size of the feeding unit 1040, a separate matching network may be unnecessary to perform impedance matching with an output impedance of a power amplifier.

In a target resonator and a feeding unit included in a wireless power receiver, a magnetic field may be distributed as illustrated in FIG. 10A. For example, the target resonator may receive a wireless power from the source resonator using a magnetic coupling. In this example, the received wireless power may generate an induced current in the target resonator. The induced current may generate a magnetic field in the target resonator, and the magnetic field may generate another induced current in the feeding unit. In this example, when the target resonator is connected to the feeding unit as illustrated in FIG. 10A, a direction of the induced current flowing through the target resonator may be identical to a direction of the induced current flowing through the feeding unit. Accordingly, a strength of a total magnetic field may increase within the feeding unit, but may decrease in a region between the feeding unit and the target resonator.

According to the teachings above, there is provided a wireless transmission and charging system, which reduces a loss of a transmission power without a separate matching circuit, by controlling a resonance frequency of the system. The resonance frequency is controlled based on a power transmission efficiency of the system. The resonance frequency is efficiently tracked in a target device consuming a relatively large amount of power.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments for accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device of a wireless power transmission system, comprising:
   a resonator configured to receive and output a power from another resonator of another device;
   a power supply unit configured to provide, to a device load, the power output from the resonator;
   a calibration load configured to receive the power output from the resonator in a calibration mode of the device to match resonance frequencies of the resonator and the other resonator; and
   a controller configured to selectively connect the resonator to the power supply unit or the calibration load, based on whether the device operates in the calibration mode.

2. The device of claim 1, wherein the controller is further configured to:
   select the calibration mode, or a charging mode of the device to provide, to the device load, the power output from the resonator, based on a request of the other device;
   generate a control signal based on the calibration mode or the charging mode; and
   selectively connect the resonator to the power supply unit or the calibration load based on the control signal.

3. The device of claim 2, wherein the controller is further configured to:
   connect the resonator to the calibration load in the calibration mode; and
   connect the resonator to the device load in the charging mode.

4. The device of claim 1, wherein the controller is further configured to:
   generate power efficiency information based on a voltage of and a current flowing through the calibration load in the calibration mode; and
   transmit, to the other device, the power efficiency information.

5. The device of claim 1, wherein:
   an impedance of the calibration load equals an impedance of the device load; and
   an amount of power consumed by the calibration load is less than an amount of power consumed by the device load.

6. The device of claim 1, wherein an impedance of the calibration load includes a real number value and an imaginary number value.

7. The device of claim 1, wherein an impedance of the calibration load changes based on a change in an impedance of the device load.

8. The device of claim 1, wherein the power supply unit comprises:
   a rectification unit configured to rectify an alternating current (AC) voltage of the power output from the resonator to generate a direct current (DC) voltage; and
   a converter configured to adjust the DC voltage to be provided to the device load.

9. A device of a wireless power transmission system, comprising:
   a resonator configured to receive and output a power from another resonator of another device;
   a rectification unit configured to rectify an alternating current (AC) voltage of the power output from the resonator to generate and output a direct current (DC) voltage;
   a converter configured to adjust the DC voltage output from the rectification unit, and to provide, to a device load, an adjusted DC voltage;
   a calibration load configured to receive the DC voltage output from the rectification unit in a calibration mode of the device to match resonance frequencies of the resonator and the other resonator; and
   a controller configured to selectively connect the rectification unit to the converter or the calibration load, based on whether the device operates in the calibration mode.

10. The device of claim 9, wherein the controller is further configured to:
    select the calibration mode, or a charging mode of the device to provide, to the device load, the adjusted DC voltage, based on a request of the other device;
    generate a control signal based on the calibration mode or the charging mode; and
    selectively connect the rectification unit or the converter or the calibration load based on the control signal.

11. The device of claim 9, wherein an impedance of the calibration load equals an impedance of the device load.

12. The device of claim 9, wherein an impedance of the calibration load includes a real number value.

13. A method of tracking a resonance frequency in a wireless power transmission system, comprising:
    transmitting, by a device, a first request to another device to enter a calibration mode to match resonance frequencies of the device and the other device;
    receiving, from the other device, a first response to the first request that indicates that the other device operates in the calibration mode;
    transmitting, to the other device, a calibration power;
    detecting a reflected wave of the calibration power; and
    matching the resonance frequencies based on the reflected wave.

14. The method of claim 13, further comprising:
    transmitting, to the other device, a second request to switch from the calibration mode to a charging mode;
    receiving, from the other device, a second response to the second request that indicates that the other device operates in the charging mode; and
    transmitting, to the other device, a charging power to be used to charge the other device, using the matched resonance frequency of the device.

15. A method of tracking a resonance frequency in a wireless power transmission system, comprising:
    transmitting, by a device, a first request to another device to enter a calibration mode to match resonance frequencies of the device and the other device;
    receiving, from the other device, a first response to the first request that indicates that the other device operates in the calibration mode;
    transmitting, to the other device, a calibration power;
    receiving, from the other device, an amount of the calibration power received in the other device; and
    matching the resonance frequencies of the device and the other device based on the amount of the calibration power received in the other device.

16. The method of claim 15, further comprising:
    transmitting, to the other device, a second request to switch from the calibration mode to a charging mode;
    receiving, from the other device, a second response to the second request that indicates that the other device operates in the charging mode; and
    transmitting, to the other device, a charging power to be used to charge the other device, using the matched resonance frequency of the device.

17. A method of tracking a resonance frequency in a wireless power transmission system, comprising:
   receiving, by a device, a first request from another device to enter a calibration mode to match resonance frequencies of the other device and the device;
   entering the calibration mode;
   transmitting, to the other device, a first response to the first request that indicates that the device operates in the calibration mode; and
   receiving, from the other device, a calibration power,
   wherein the resonance frequencies are matched based on a reflected wave of the calibration power.

18. The method of claim 17, further comprising:
   receiving, from the other device, a second request to switch from the calibration mode to a charging mode;
   switching from the calibration mode to the charging mode;
   transmitting, to the other device, a second response to the second request that indicates that the device operates in the charging mode; and
   receiving, from the other device, a charging power to be used to charge the device, using the matched resonance frequency of the device.

19. A method of tracking a resonance frequency in a wireless power transmission system, comprising:
   receiving, by a device, a first request from another device to enter a calibration mode to match resonance frequencies of the other device and the device;
   entering the calibration mode;
   transmitting, to the other device, a first response to the first request that indicates that the device operates in the calibration mode;
   receiving, from the other device, a calibration power; and
   transmitting, to the other device, an amount of the calibration power received in the device,
   wherein the resonance frequencies are matched based on the amount of the calibration power received in the device.

20. The method of claim 19, further comprising:
   receiving, from the other device, a second request to switch from the calibration mode to a charging mode;
   switching from the calibration mode to the charging mode;
   transmitting, to the other device, a second response to the second request that indicates that the device operates in the charging mode; and
   receiving, from the other device, a charging power to be used to charge the device, using the matched resonance frequency of the device.

* * * * *